(12) United States Patent
Park et al.

(10) Patent No.: US 11,440,984 B2
(45) Date of Patent: Sep. 13, 2022

(54) OLEFIN-BASED POLYMER

(71) Applicant: LG Chem, Ltd., Seoul (KR)

(72) Inventors: Sang Eun Park, Daejeon (KR); Eun Jung Lee, Daejeon (KR); Hyun Jin Ju, Daejeon (KR); In Sung Park, Daejeon (KR); Kyung Bok Bae, Daejeon (KR); Choong Hoon Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/769,814

(22) PCT Filed: Dec. 24, 2018

(86) PCT No.: PCT/KR2018/016581
§ 371 (c)(1),
(2) Date: Jun. 4, 2020

(87) PCT Pub. No.: WO2019/132477
PCT Pub. Date: Jul. 4, 2019

(65) Prior Publication Data
US 2020/0369807 A1 Nov. 26, 2020

(30) Foreign Application Priority Data
Dec. 26, 2017 (KR) .................. 10-2017-0179658

(51) Int. Cl.
C08F 210/16 (2006.01)
C08F 210/02 (2006.01)
C07F 7/28 (2006.01)
C08F 210/08 (2006.01)
C08F 210/14 (2006.01)

(52) U.S. Cl.
CPC ........... *C08F 210/16* (2013.01); *C07F 7/28* (2013.01); *C08F 210/08* (2013.01); *C08F 210/14* (2013.01); *C08F 210/02* (2013.01); *C08F 2500/03* (2013.01); *C08F 2500/08* (2013.01); *C08F 2500/12* (2013.01)

(58) Field of Classification Search
CPC ................................... C08F 210/16
See application file for complete search history.

(56) References Cited

U.S. PATENT DOCUMENTS

| | | | |
|---|---|---|---|
| 5,993,922 A | 11/1999 | Babrowicz et al. | |
| 6,989,344 B2* | 1/2006 | Cann | C08F 10/00 502/154 |
| 7,220,801 B2* | 5/2007 | Dunaway | C08L 23/0815 525/240 |
| 7,432,328 B2* | 10/2008 | Jaker | B29C 49/0005 525/240 |
| 7,714,072 B2* | 5/2010 | Michie, Jr. | C08F 8/00 528/502 A |
| 7,868,092 B2* | 1/2011 | Kwalk | C08L 23/0815 525/240 |
| 8,129,472 B2* | 3/2012 | Turner | C08L 23/04 525/240 |
| 8,679,602 B2* | 3/2014 | Michie, Jr. | C08F 210/16 526/348.2 |
| 9,175,111 B2* | 11/2015 | Kapur | C08F 210/16 |
| 9,988,505 B2* | 6/2018 | Gao | B32B 27/327 |
| 10,227,428 B2* | 3/2019 | Goode | C08F 210/16 |
| 2004/0152842 A1 | 8/2004 | Dunaway | |
| 2005/0255196 A1* | 11/2005 | Opuszko | B65B 25/001 426/106 |
| 2007/0260023 A1 | 11/2007 | Jones et al. | |
| 2011/0032621 A1 | 2/2011 | Marchand et al. | |
| 2011/0318514 A1* | 12/2011 | Patterson | C08F 210/16 526/113 |
| 2016/0326281 A1 | 11/2016 | Kim et al. | |
| 2017/0327606 A1* | 11/2017 | Habibi | C08F 10/02 |
| 2019/0161590 A1* | 5/2019 | Kwon | C08F 210/16 |
| 2019/0233553 A1 | 8/2019 | Kim et al. | |

FOREIGN PATENT DOCUMENTS

| | | | | |
|---|---|---|---|---|
| CN | 1535295 A | | 10/2004 | |
| CN | 101983213 A | | 3/2011 | |
| CN | 106633318 A | * | 5/2017 | .............. C08L 23/08 |
| CN | 106633323 A | * | 5/2017 | .............. C08L 23/08 |
| CN | 106661142 A | | 5/2017 | |
| CN | 107304265 A | * | 10/2017 | .............. C08L 23/08 |

(Continued)

OTHER PUBLICATIONS

Extended European Search Report including Written Opinion for Application No. EP18896300.3 dated Dec. 2, 2020, pp. 1-8.
International Search Report from Application No. PCT/KR2018/016581 dated Apr. 8, 2019, 2 pages.
Ryabov et al., "Constrained Geometry Complexes of Titanium (IV) and Zirconium ([V) Involving Cyclopentadienyl Fused to Thiophene Ring", Journal of Organometallic Chemistry, Jun. 2005, vol. 690, No. I 9, pp. 4213-4221.
Search Report dated Jul. 13, 2022 from the Office Action for Chinese Application No. 201880080391.9 dated Jul. 19, 2022, 2 pages.

*Primary Examiner* — Rip A Lee

(74) *Attorney, Agent, or Firm* — Lerner, David, Littenberg, Krumholz & Mentlik, LLP

(57) ABSTRACT

The present invention relates to an olefin-based polymer, which has (1) a density (d) ranging from 0.85 to 0.90 g/cc, (2) a melt index (MI, 190° C., 2.16 kg load conditions) ranging from 0.1 g/10 min to 15 g/10 min, (3) a molecular weight distribution (MWD) in a range of 1.0 to 3.0, and (4) a number average molecular weight (Mn) and a Z+1 average molecular weight (Mz+1) satisfying the Equation 1, {Mn/(Mz+1)}×100>15. The olefin-based polymer according to the present invention is a low-density olefin-based polymer and exhibits excellent tensile strength due to having improved molecular weight as compared to the flow index.

13 Claims, No Drawings

(56) References Cited

FOREIGN PATENT DOCUMENTS

| CN | 109311918 A | 2/2019 | |
|----|----|----|----|
| EP | 0889780 A1 | 1/1999 | |
| EP | 3708595 A1 | 9/2020 | |
| JP | 2017-25160 A * | 2/2017 | ............ C08F 10/02 |
| KR | 100288272 B1 | 2/2001 | |
| KR | 20100134571 A | 12/2010 | |
| KR | 20160054849 A | 5/2016 | |
| WO | 9502630 A1 | 1/1995 | |
| WO | 9736741 A1 | 10/1997 | |
| WO | 02092564 A2 | 11/2002 | |
| WO | 03000790 A1 | 1/2003 | |
| WO | 2005118654 A1 | 12/2005 | |
| WO | 2009032051 A1 | 3/2009 | |

* cited by examiner

OLEFIN-BASED POLYMER

CROSS-REFERENCE TO RELATED APPLICATION

The present application is a national phase entry under 35 U.S.C. § 371 of International Application No. PCT/KR2018/016581 filed Dec. 24, 2018, which claims priority from Korean Patent Application No. 10-2017-0179658 filed Dec. 26, 2017, all of which are incorporated herein by reference.

TECHNICAL FIELD

The present invention relates to an olefin-based polymer, and specifically, to a low-density olefin-based polymer having a high-molecular weight and an improved tensile strength.

BACKGROUND ART

Polyolefins are widely used for extrusion-molded articles, blow-molded articles and injection-molded articles due to excellent moldability, heat resistance, mechanical properties, hygienic quality, water vapor permeability and appearance characteristics of molded articles thereof. However, polyolefins, particularly polyethylene, have a problem of low compatibility with polar resins such as nylon because of the absence of polar groups in the molecule, and low adhesiveness to polar resins and metals. As a result, it is difficult to blend the polyolefin with polar resins or metals, or to laminate the polyolefin with these materials. Further, a molded article of a polyolefin has a problem of low surface hydrophilicity and a low antistatic property.

In order to solve such a problem and to increase the affinity for a polar material, a method of grafting a polar group-containing monomer onto a polyolefin through radical polymerization has been widely used. However, this method has a problem in that cross-linking in the molecules of the polyolefin and cleavage of molecular chains occur during the grafting reaction, and the viscosity balance of a graft polymer and a polar resin is poor, and thus miscibility is low. There is also a problem in that the appearance characteristics of a molded article are low due to a gel component generated by intramolecular crosslinking or a foreign substance generated by cleavage of molecular chains.

Further, as a method of preparing an olefin polymer such as an ethylene homopolymer, an ethylene/α-olefin copolymer, a propylene homopolymer or a propylene/α-olefin copolymer, a method of copolymerizing a polar monomer in the presence of a metal catalyst such as a titanium catalyst or a vanadium catalyst was used. However, when the above-described metal catalyst is used to copolymerize a polar monomer, there is a problem that the molecular weight distribution or composition distribution is wide, and polymerization activity is low.

As another method, a method of polymerizing in the presence of a metallocene catalyst including a transition metal compound such as zircononocene dichloride and an organoaluminum oxy compound (aluminoxane) is known. When a metallocene catalyst is used, a high-molecular weight olefin polymer is obtained with high activity, and the resulting olefin polymer has a narrow molecular weight distribution and a narrow composition distribution.

Further, as a method of preparing a polyolefin containing a polar group using a metallocene compound having a ligand of a non-crosslinked cyclopentadienyl group, a crosslinked or non-crosslinked bisindenyl group, or an ethylene crosslinked unsubstituted indenyl/fluorenyl group as a catalyst, a method using a metallocene catalyst is also known. However, these methods have a disadvantage in that polymerization activity is very low. For this reason, a method of protecting a polar group by a protecting group is carried out, but there is a problem that the process becomes complicated since a protecting group should be removed again after the reaction when the protecting group is introduced.

An ansa-metallocene compound is an organometallic compound containing two ligands connected to each other by a bridge group, in which the rotation of the ligand is prevented and the activity and structure of the metal center are determined by the bridge group.

The ansa-metallocene compound is used as a catalyst in the preparation of olefin-based homopolymers or copolymers. In particular, it is known that an ansa-metallocene compound containing a cyclopentadienyl-fluorenyl ligand can prepare a high-molecular weight polyethylene, thereby controlling the microstructure of the polypropylene.

Further, it is also known that an ansa-metallocene compound containing an indenyl ligand can produce a polyolefin having excellent activity and improved stereoregularity.

As described above, various studies have been made on ansa-metallocene compounds capable of controlling the microstructure of olefin-based polymers and having higher activity, but the research is still insufficient.

DISCLOSURE

Technical Problem

An object of the present invention is to provide a low-density olefin-based polymer having improved tensile strength due to an increasing molecular weight.

Technical Solution

In order to achieve the object, the present invention provides an olefin-based polymer which has (1) a density (d) ranging from 0.85 to 0.90 g/cc, (2) a melt index (MI, 190° C., 2.16 kg load conditions) ranging from 0.1 g/10 min to 15 g/10 min, (3) a molecular weight distribution (MWD) in a range of 1.0 to 3.0, and (4) a number average molecular weight (Mn) and a Z+1 average molecular weight (Mz+1) satisfying the following Equation 1.

$$\{Mn/(Mz+1)\} \times 100 > 15 \qquad \text{[Equation 1]}$$

Advantageous Effects

The olefin-based polymer according to the present invention is a low-density olefin-based polymer has an improved tensile strength due to an increasing molecular weight.

BEST MODE FOR CARRYING OUT THE INVENTION

Hereinafter, the present invention will be described in more detail to assist in the understanding of the present invention.

Terminology used in the specification and claims should not be construed as limited to conventional or literal meanings, and should be construed as having meanings and concepts corresponding to the technical idea of the present invention based on the principle that the inventor can suitably define the concept of a term to explain his own invention in the most preferable way.

In the specification, the term "a polymer" denotes a polymer compound prepared by the polymerization of monomers having the same or different types. The general term "the polymer" includes "a hybrid polymer" as well as "a homopolymer," "a copolymer" and "a terpolymer." Further, "the hybrid polymer" denotes a polymer prepared by the polymerization of at least two different types of monomers. The general term "the hybrid polymer" denotes "the copolymer" (commonly used for denoting a polymer prepared using two different types of monomers) and "the terpolymer" (commonly used for denoting a polymer prepared using three different types of monomers). "The hybrid polymer" includes a polymer prepared by the polymerization of at least four different types of monomers.

An olefin-based polymer according to the present invention satisfies the following conditions of (1) to (4):

(1) a density (d) ranging from 0.85 g/cc to 0.90 g/cc, (2) a melt index (MI, 190° C., 2.16 kg load conditions) ranging from 0.1 g/10 min to 15 g/10 min, (3) a molecular weight distribution (MWD) in a range of 1.0 to 3.0, and (4) a number average molecular weight (Mn) and a Z+1 average molecular weight (Mz+1) satisfying the following Equation 1.

$$\{Mn/(Mz+1)\} \times 100 > 15 \qquad \text{[Equation 1]}$$

Generally, the lower the density and the lower the hardness of the polymer, the better the foaming. The olefin-based polymer according to the present invention exhibits low hardness when it has a density of the same level as that of conventional olefin-based polymers while having a very low density, and thus can exhibit more excellent foamability.

The olefin-based polymer according to the present invention exhibits a low density in the range of 0.85 g/cc to 0.90 g/cc when measured in accordance with ASTM D-792, specifically in the range of 0.85 g/cc to 0.89 g/cc, and more specifically in the range of 0.855 g/cc to 0.89 g/cc. The olefin-based polymer according to the present invention exhibits a low density in the above-described range, so that excellent foamability can be exhibited.

(2) The melt index (MI) may be controlled by adjusting the amount of the catalyst used in the polymerization of the olefin-based polymer with respect to the comonomer, and affects the mechanical properties, impact strength and moldability of the olefin-based polymer. In the present specification, the melt index is measured at 190° C. under a load of 2.16 kg in accordance with ASTM D1238 at a low density of 0.85 g/cc to 0.90 g/cc, and may be in the range of 0.1 g/10 min to 3 g/10 min, specifically, in the range of 0.2 g/10 min to 2 g/10 min, and more specifically, in the range of 0.25 g/10 min to 1.8 g/10 min.

The olefin-based polymer according to the present invention has a ultra-low density, and a high melt temperature and a high hardness when the olefin-based polymer has a density and a melt index of the same level as those of a conventional olefin-based polymer, and thus can exhibit superior tensile strength.

Further, The olefin-based polymer according to an embodiment of the present invention may have (3) a molecular weight distribution (MWD), which is a ratio (Mw/Mn) of a weight average molecular weight (Mw) to a number average molecular weight (Mn), in the range of 1.0 to 3.0, specifically in the range of 1.5 to 3.0, and more specifically in the range of 1.8 to 3.0. The olefin-based polymer according to an embodiment of the present invention may exhibit a high molecular weight and a narrow molecular weight distribution.

Further, The olefin-based polymer according to an embodiment of the present invention may have (4) a number average molecular weight (Mn) and a Z+1 average molecular weight (Mz+1) satisfying the following Equation 1.

$$\{Mn/(Mz+1)\} \times 100 > 15 \qquad \text{[Equation 1]}$$

The olefin-based polymer according to an embodiment of the present invention has a value of 15 or more, which is obtained by dividing a value of the number average molecular weight (Mn) by a value of z+1 average molecular weight (Mz+1) and multiplied it by 100. The olefin-based polymer according to the present invention has a higher number average molecular weight (Mn) when it has a z+1 average molecular weight (Mz+1) of the same level as that of conventional olefin-based polymers.

Mn, Mw and Mz+1 are defined as follows.

$$M_n = \frac{\sum N_i M_i}{\sum N_i}$$

$$M = \frac{\sum N_i M_i^{n+1}}{\sum N_i M_i^n}$$

When n=1, M=Mw, and when n=3, M=Mz+1.

Mn is the number average molecular weight; Mw is the weight average molecular weight; and Mz+1 is the Z+1 average molecular weight. All are terms referring to the average molecular weight.

The olefin-based polymer according to an embodiment of the present invention may have (5) a weight average molecular weight (Mw) in the range of 10,000 g/mol to 500,000 g/mol, specifically in the range of 20,000 g/mol to 300,000 g/mol, and more specifically in the range of 50,000 g/mol to 200,000 g/mol.

Further, the olefin-based polymer according to an embodiment of the present invention may have (6) a number average molecular weight (Mn) in the range of 8,000 g/mol to 300,000 g/mol, specifically in the range of 10,000 g/mol to 200,000 g/mol, and more specifically in the range of 20,000 g/mol to 80,000 g/mol.

In the present invention, the weight average molecular weight (Mw) and the number average molecular weight (Mn) are a polystyrene-converted molecular weight which is analyzed by gel permeation chromatography (GPC).

Further, the olefin-based polymer according to an embodiment of the present invention has (7) a Z+1 average molecular weight (Mz+1) in a range of 50,000 g/mol to 1,500,000 g/mol, specifically in the range of 80,000 g/mol to 1,000,000 g/mol, and more specifically in the range of 100,000 g/mol to 900,000 g/mol. When the olefin-based polymer satisfies the Z+1 average molecular weight (Mz+1) in the above range, it exhibits excellent hardness due to including an appropriate high molecular weight component, and can exhibit an improved tensile strength.

Generally, the density of the olefin-based polymer is affected by the type and content of the monomers used in the polymerization, the degree of polymerization and the like, and the copolymer is highly affected by the content of the comonomer. The olefin-based polymer of the present invention is polymerized using a catalyst composition containing two types of transition metal compounds having a characteristic structure, and a large amount of comonomers may be introduced, and the olefin-based polymer of the present invention has a low density in the range as described above.

Specifically, when the olefin-based polymer according to an embodiment of the present invention, which is a copolymer of ethylene and 1-butene, satisfies the density in the range of 0.855 g/cc to 0.870 g/cc and the melt index (MI) in the range of 0.1 g/10 min to 2 g/10 min, the olefin-based polymer may satisfy in a range of 10,000 g/mol to 500,000 g/mol, specifically in the range of 20,000 g/mol to 300,000 g/mol, and more specifically in the range of 50,000 g/mol to 200,000 g/mol. Further, when the olefin-based polymer satisfies a density in the range of 0.855 g/cc to 0.865 g/cc and a melt index (MI) in the range of 0.1 g/10 min to 2 g/10 min, a tensile strength at break measured in accordance with ASTM D638 may be in the range of 10 to 200, specifically, in the range of 15 to 170.

Further, the olefin-based polymer according to an embodiment of the present invention may have (8) $I_{10}/I_2 > 7.91$ $(MI_{2.16})^{-0.188}$. The $I_{10}$ and $I_{2.16}$ represent a melt index (MI), measured in accordance with ASTM D-1238, and may be used as a marker of a molecular weight.

The olefin-based polymer is a homopolymer or two or more copolymers selected from an olefin-based monomer, specifically, an alpha-olefin-based monomer, a cyclic olefin-based monomer, a diene olefin-based monomer, a triene olefin-based monomer, and a styrene-based monomer. More specifically, the olefin-based polymer may be a copolymer of ethylene and an alpha-olefin having 3 to 12 carbon atoms or 3 to 10 carbon atoms.

The alpha-olefin comonomer may include any one or a mixture of two or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene and 3-chloromethyl styrene.

More specifically, the olefin copolymer according to an embodiment of the present invention may be a copolymer of ethylene and propylene, ethylene and 1-butene, ethylene and 1-hexene, ethylene and 4-methyl-1-pentene or ethylene and 1-octene.

When the olefin-based polymer is a copolymer of ethylene and an alpha-olefin, the amount of the alpha-olefin may be 80 wt % or less, more specifically 60 wt % or less, still more specifically in the range of 5 wt % to 40 wt % with respect to a total weight of the copolymer.

When the alpha-olefin is included in the above-described range, it is easy to realize the above-mentioned physical properties.

The olefin-based polymer according to an embodiment of the present invention, which has the above-described physical properties and constitutional characteristics may be prepared by a continuous solution polymerization reaction in the presence of a metallocene catalyst composition including at least one type of a transition metal compound in a single reactor. Accordingly, in the olefin-based polymer according to an embodiment of the present invention, a block formed by linearly connecting two or more repeating units derived from one monomer among monomers constituting a polymer in the polymer is not formed. That is, the olefin-based polymer according to the present invention does not include a block copolymer, but may be selected from the group consisting of a random copolymer, an alternating copolymer and a graft copolymer, more particularly, may be a random copolymer.

Specifically, the olefin-based polymer of the present invention may be obtained by a preparation method including a step of polymerizing an olefin-based monomer in the presence of a catalyst composition for olefin polymerization including a transition metal compound represented by the following Formula 1.

However, in the preparation of an olefin-based polymer according to an embodiment of the present invention, the structure range of transition metal compound 1 is not limited to specifically disclosed types, and all modifications, equivalents, or replacements included in the scope and technical range of the present invention should be understood to be included in the present invention.

[Formula 1]

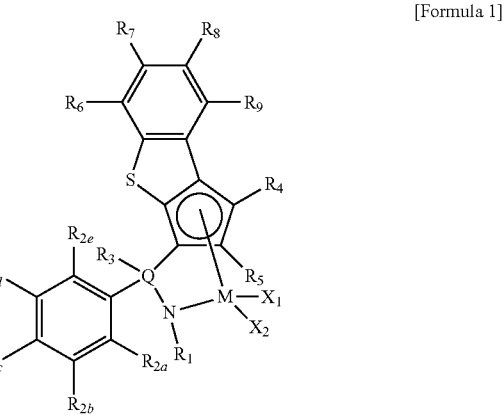

In Formula 1, $R_1$ is hydrogen; an alkyl having 1 to 20 carbon atoms; a cycloalkyl having 3 to 20 carbon atoms; an alkenyl having 2 to 20 carbon atoms; an alkoxy having 1 to 20 carbon atoms; an aryl having 6 to 20 carbon atoms; an arylalkoxy having 7 to 20 carbon atoms; an alkylaryl having 7 to 20 carbon atoms; or an arylalkyl having 7 to 20 carbon atoms, $R_{2a}$ to $R_{2e}$ each independently represent hydrogen; a halogen; an alkyl having 1 to 20 carbon atoms; a cycloalkyl having 3 to 20 carbon atoms; an alkenyl having 2 to 20 carbon atoms; an alkoxy having 1 to 20 carbon atoms; or an aryl having 6 to 20 carbon atoms, $R_3$ is hydrogen; a halogen; an alkyl having 1 to 20 carbon atoms; a cycloalkyl having 3 to 20 carbon atoms; an alkenyl having 2 to 20 carbon atoms; an aryl having 6 to 20 carbon atoms; an alkylaryl having 7 to 20 carbon atoms; an arylalkyl having 7 to 20 carbon atoms; an alkylamido having 1 to 20 carbon atoms; an arylamido having 6 to 20 carbon atoms; an alkylidene having 1 to 20 carbon atoms; or phenyl substituted with one or more selected from the group consisting of a halogen, an alkyl having 1 to 20 carbon atoms, a cycloalkyl having 3 to 20 carbon atoms, an alkenyl having 2 to 20 carbon atoms, an alkoxy having 1 to 20 carbon atoms, and an aryl having 6 to 20 carbon atoms, $R_4$ to $R_9$ each independently represent hydrogen; a silyl; an alkyl having 1 to 20 carbon atoms; a cycloalkyl having 3 to 20 carbon atoms; an alkenyl having 2 to 20 carbon atoms; an aryl having 6 to 20 carbon atoms; an alkylaryl having 7 to 20 carbon atoms; an arylalkyl having 7 to 20 carbon atoms; or a metalloid radical of a Group 14 metal substituted with a hydrocarbyl having 1 to 20 carbon atoms; two or more adjacent ones of $R_6$ to $R_9$ may be connected to each other to form a ring, Q is Si, C, N, P or S, M is a Group 4 transition metal, $X_1$ and $X_2$ are each independently hydrogen; a halogen; an alkyl having 1 to 20 carbon atoms; a cycloalkyl having 3 to 20 carbon atoms; an alkenyl having 2 to 20 carbon atoms; an aryl having 6 to 20 carbon atoms; an alkylaryl having 7 to 20 carbon atoms; an arylalkyl having 7 to 20 carbon atoms; an alkylamino having 1 to 20 carbon atoms; an arylamino having 6 to 20 carbon atoms; or an alkylidene having 1 to 20 carbon atoms.

According to an embodiment of the present invention, in the transition metal compound represented by Formula 1, $R_1$ may be hydrogen; an alkyl having 1 to 20 carbon atoms; a cycloalkyl having 3 to 20 carbon atoms; an alkoxy having 1 to 20 carbon atoms; an aryl having 6 to 20 carbon atoms; an arylalkoxy having 7 to 20 carbon atoms; an alkylaryl having 7 to 20 carbon atoms; or an arylalkyl having 7 to 20 carbon atoms, $R_{2a}$ to $R_{2e}$ each may independently represent hydrogen; a halogen; an alkyl having 1 to 12 carbon atoms; a cycloalkyl having 3 to 12 carbon atoms; an alkenyl having 2 to 12 carbon atoms; an alkoxy having 1 to 12 carbon atoms; or phenyl, $R_3$ may be hydrogen; a halogen; an alkyl having 1 to 12 carbon atoms; a cycloalkyl having 3 to 12 carbon atoms; an alkenyl having 2 to 12 carbon atoms; an aryl having 6 to 20 carbon atoms; an alkylaryl having 7 to 13 carbon atoms; an arylalkyl having 7 to 13 carbon atoms; or phenyl substituted with one or more selected from the group consisting of a halogen, an alkyl having 1 to 12 carbon atoms, a cycloalkyl having 3 to 12 carbon atoms, an alkenyl having 2 to 12 carbon atoms, an alkoxy having 1 to 12 carbon atoms and phenyl, $R_4$ to $R_9$ each may independently represent hydrogen; an alkyl having 1 to 20 carbon atoms; a cycloalkyl having 3 to 20 carbon atoms; an aryl having 6 to 20 carbon atoms; an alkylaryl having 7 to 20 carbon atoms; or an arylalkyl having 7 to 20 carbon atoms, two or more adjacent ones of $R_6$ to $R_9$ may be connected to each other to form an aliphatic ring having 5 to 20 carbon atoms or an aromatic ring having 6 to 20 carbon atoms; the aliphatic ring or aromatic ring may be substituted with a halogen, an alkyl having 1 to 20 carbon atoms, an alkenyl having 2 to 12 carbon atoms, or an aryl having 6 to 12 carbon atoms, Q may be Si, M may be Ti, $X_1$ and $X_2$ each may independently represent hydrogen; a halogen; an alkyl having 1 to 12 carbon atoms; a cycloalkyl having 3 to 12 carbon atoms; an alkenyl having 2 to 12 carbon atoms; an aryl having 6 to 12 carbon atoms; an alkylaryl having 7 to 13 carbon atoms; an arylalkyl having 7 to 13 carbon atoms; an alkylamino having 1 to 13 carbon atoms; an arylamino having 6 to 12 carbon atoms; or an alkylidene having 1 to 12 carbon atoms.

According to another embodiment of the present invention, in the transition metal compound represented by Formula 1, $R_1$ may be hydrogen; an alkyl having 1 to 12 carbon atoms; a cycloalkyl having 3 to 12 carbon atoms; an alkoxy having 1 to 12 carbon atoms; an aryl having 6 to 12 carbon atoms; an arylalkoxy having 7 to 13 carbon atoms; an alkylaryl having 7 to 13 carbon atoms; or an arylalkyl having 7 to 13 carbon atoms, $R_{2a}$ to $R_{2e}$ each may independently represent hydrogen; a halogen; an alkyl having 1 to 12 carbon atoms; a cycloalkyl having 3 to 12 carbon atoms; an alkenyl having 2 to 12 carbon atoms; an alkoxy having 1 to 12 carbon atoms; or phenyl, $R_3$ may be hydrogen; a halogen; an alkyl having 1 to 12 carbon atoms; a cycloalkyl having 3 to 12 carbon atoms; an alkenyl having 2 to 12 carbon atoms; an alkylaryl having 7 to 13 carbon atoms; an arylalkyl having 7 to 13 carbon atoms; phenyl; or phenyl substituted with one or more selected from the group consisting of a halogen, an alkyl having 1 to 12 carbon atoms, a cycloalkyl having 3 to 12 carbon atoms, an alkenyl having 2 to 12 carbon atoms, an alkoxy having 1 to 12 carbon atoms and phenyl, $R_4$ to $R_9$ each may independently represent hydrogen; an alkyl having 1 to 12 carbon atoms; a cycloalkyl having 3 to 12 carbon atoms; an aryl having 6 to 12 carbon atoms; an alkylaryl having 7 to 13 carbon atoms; or an arylalkyl having 7 to 13 carbon atoms, two or more adjacent ones of $R_6$ to $R_9$ may be connected to each other to form an aliphatic ring having 5 to 12 carbon atoms or an aromatic ring having 6 to 12 carbon atoms;

the aliphatic or aromatic ring may be substituted with a halogen, an alkyl having 1 to 12 carbons, an alkenyl having 2 to 12 carbons, or an aryl having 6 to 12 carbons, Q may be Si, M may be Ti, $X_1$ and $X_2$ each may independently represent hydrogen; a halogen; an alkyl group having 1 to 12 carbon atoms; or an alkenyl having 2 to 12 carbon atoms.

Further, according to still another embodiment of the present invention, in the transition metal compound represented by Formula 1, $R_1$ may be hydrogen or an alkyl having 1 to 12 carbon atoms, $R_{2a}$ to $R_{2e}$ each may independently represent hydrogen; an alkyl having 1 to 12 carbon atoms; or an alkoxy having 1 to 12 carbon atoms, $R_3$ may be hydrogen; an alkyl having 1 to 12 carbon atoms; or phenyl, $R_4$ and $R_5$ each may independently represent hydrogen; or an alkyl having 1 to 12 carbon atoms, $R_6$ to $R_9$ each may independently represent hydrogen or methyl, Q may be Si, M may be Ti, $X_1$ and $X_2$ each may independently represent hydrogen or an alkyl having 1 to 12 carbon atoms.

The compound represented by Formula 1 may specifically be any one of the compounds represented by the following Formulas 1-1 to 1-10.

[Formula 1-1]

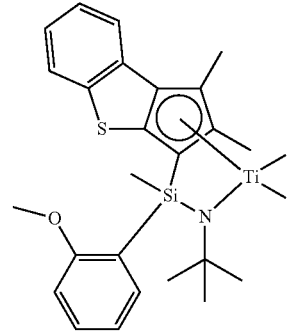

[Formula 1-2]

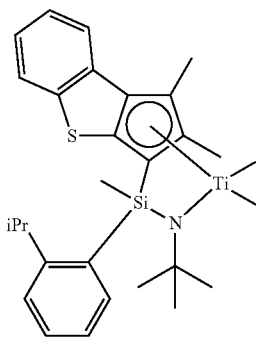

[Formula 1-3]

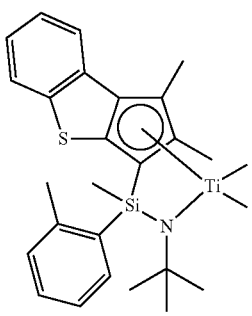

[Formula 1-4]

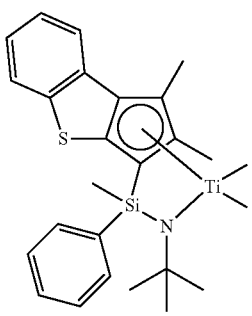

[Formula 1-5]

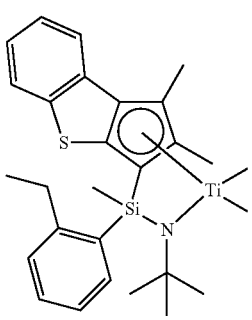

[Formula 1-6]

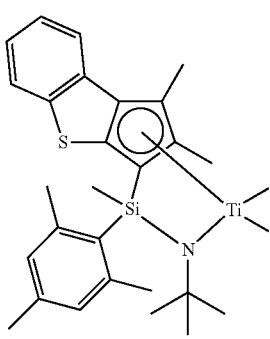

[Formula 1-7]

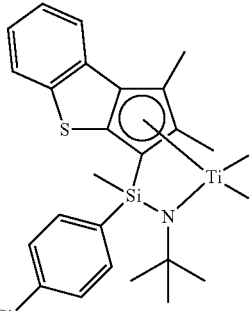

[Formula 1-8]

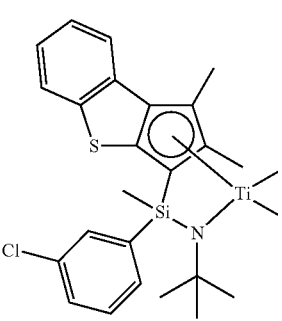

[Formula 1-9]

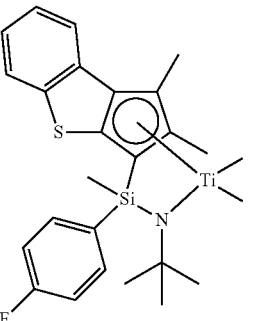

[Formula 1-10]

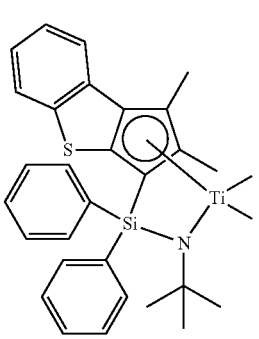

In addition, it may be a compound having various structures within the ranges defined in Formula 1.

Further, in the transition metal compound represented by Formula 1, a metal site is connected by a cyclopentadienyl ligand to which benzothiophene is fused, and the structure thereof has a narrow Cp-M-N angle and a wide $X_1$-M-$X_2$ angle to which a monomer approaches. In addition, the benzothiophene fused cyclopentadienyl ligand, Si, nitrogen and the metal site are connected in order via the bonding of a ring shape to form a more stable and rigid pentagonal ring structure. Therefore, when these compounds are activated by reacting with a cocatalyst such as methylaluminoxane or $B(C_6F_5)_3$ and then applied to olefin polymerization, an olefin-based polymer having characteristics such as high activity, high molecular weight, high copolymerization properties and the like may be polymerized even at a high polymerization temperature.

Each of the substituents defined in the present specification will be described in detail as follows.

In the present specification, unless particularly defined otherwise, a "hydrocarbyl group" means a monovalent hydrocarbon group having 1 to 20 carbon atoms formed only with carbon and hydrogen regardless of its structure such as an alkyl group, an aryl group, an alkenyl group, an alkinyl group, a cycloalkyl group, an alkylaryl group and an arylalkyl group.

The term "halogen" used in the present specification, unless otherwise specified, refers to fluorine, chlorine, bromine and iodine.

The term "alkyl" used in the present specification, unless otherwise specified, refers to a linear or branched hydrocarbon residue.

The term "alkenyl" used in the present specification, unless otherwise specified, refers to a linear or branched alkenyl group.

The branched chain may be an alkyl having 1 to 20 carbon atoms; an alkenyl having 2 to 20 carbon atoms; an aryl having 6 to 20 carbon atoms; an alkylaryl having 7 to 20 carbon atoms; or an arylalkyl having 7 to 20 carbon atoms.

According to an embodiment of the present invention, the aryl group preferably has 6 to 20 carbon atoms, and specifically includes phenyl, naphthyl, anthracenyl, pyridyl, dimethylanilinyl, anisolyl and the like, but is not limited thereto.

The alkylaryl group refers to an aryl group substituted with the alkyl group.

The arylalkyl group refers to an alkyl group substituted with the aryl group.

The ring (or a heterocyclic group) refers to a monovalent aliphatic or aromatic hydrocarbon group which has a ring atom with 5 to 20 carbon atoms and contains one or more heteroatoms, and may be a single ring or a condensed ring of two or more rings. Further, the heterocyclic group may be unsubstituted or substituted with an alkyl group. Examples thereof include indoline, tetrahydroquinoline and the like, but the present invention is not limited thereto.

The alkylamino group refers to an amino group substituted with the alkyl group, and includes a dimethylamino group, a diethylamino group and the like, but is not limited thereto.

According to an embodiment of the present invention, the aryl group preferably has 6 to 20 carbon atoms, and specifically includes phenyl, naphthyl, anthracenyl, pyridyl, dimethylanilinyl, anisolyl and the like, but is not limited thereto.

The transition metal compound of Formula 1 and a ligand compound of Formula 2 allow introduction of a large amount of an alpha-olefin as well as low-density polyethylene due to the structural characteristics of the catalyst, and thus it is possible to prepare a low-density polyolefin copolymer having a density in the range of 0.85 to 0.90 g/cc, specifically, in the range of 0.85 g/cc to 0.89 g/cc, and more specifically, in the range of 0.855 g/cc to 0.89 g/cc.

The transition metal compound of Formula 1 may be prepared from a ligand compound represented by the following Formula 2.

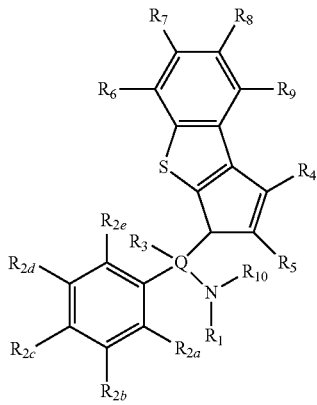

[Formula 2]

In Formula 2, $R_1$ and $R_{10}$ each independently represent hydrogen; an alkyl having 1 to 20 carbon atoms; a cycloalkyl having 3 to 20 carbon atoms; an alkenyl having 2 to 20 carbon atoms; an alkoxy having 1 to 20 carbon atoms; an aryl having 6 to 20 carbon atoms; an arylalkoxy having 7 to 20 carbon atoms; an alkylaryl having 7 to 20 carbon atoms; or an arylalkyl having 7 to 20 carbon atoms, $R_{2a}$ to $R_{2e}$ each independently represent hydrogen; a halogen; an alkyl having 1 to 20 carbon atoms; a cycloalkyl having 3 to 20 carbon atoms; an alkenyl having 2 to 20 carbon atoms; an alkoxy having 1 to 20 carbon atoms; or an aryl having 6 to 20 carbon atoms, $R_3$ is hydrogen; a halogen; an alkyl having 1 to 20 carbon atoms; a cycloalkyl having 3 to 20 carbon atoms; an alkenyl having 2 to 20 carbon atoms; an aryl having 6 to 20 carbon atoms; an alkylaryl having 6 to 20 carbon atoms; an arylalkyl having 7 to 20 carbon atoms; an alkylamido having 1 to 20 carbon atoms; an arylamido having 6 to 20 carbon atoms; an alkylidene having 1 to 20 carbon atoms; or phenyl substituted with one or more selected from the group consisting of a halogen, an alkyl having 1 to 20 carbon atoms, a cycloalkyl having 3 to 20 carbon atoms, an alkenyl having 2 to 20 carbon atoms, an alkoxy having 1 to 20 carbon atoms, and an aryl having 6 to 20 carbon atoms, $R_4$ to $R_9$ each independently represent hydrogen; a silyl; an alkyl having 1 to 20 carbon atoms; a cycloalkyl having 3 to 20 carbon atoms; an alkenyl having 2 to 20 carbon atoms; an aryl having 6 to 20 carbon atoms; an alkylaryl having 7 to 20 carbon atoms; an arylalkyl having 7 to 20 carbon atoms; or a metalloid radical of a Group 14 metal substituted with a hydrocarbyl having 1 to 20 carbon atoms; and two or more adjacent ones of $R_6$ to $R_9$ may be connected to each other to form a ring, Q is Si, C, N, P or S.

In the ligand compound, the definitions of $R_1$ to $R_9$ in the compound represented by Formula 2 may be the same as those in the compound represented by Formula 1, which is a transition metal compound.

The compound represented by Formula 2 may specifically be any one of the compounds represented by Formulas 2-1 to 2-10.

[Formula 2-1]
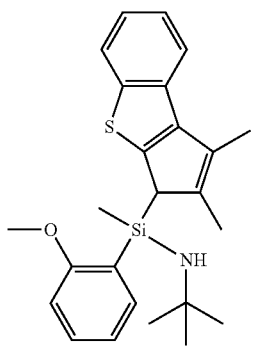
[Formula 2-2]
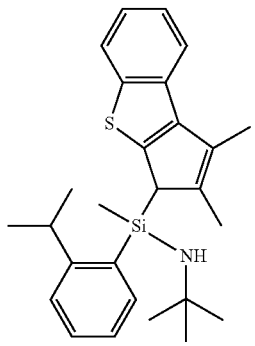
[Formula 2-3]
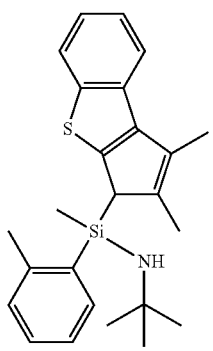
[Formula 2-4]
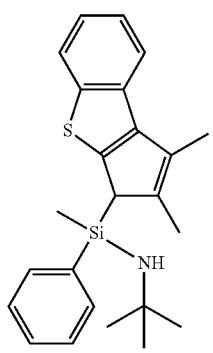
[Formula 2-5]
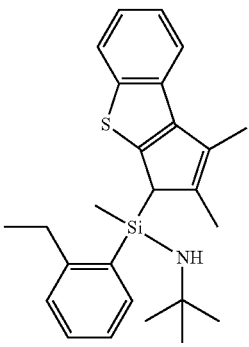
[Formula 2-6]
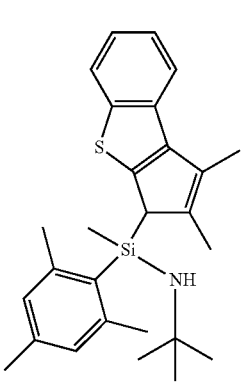
[Formula 2-7]
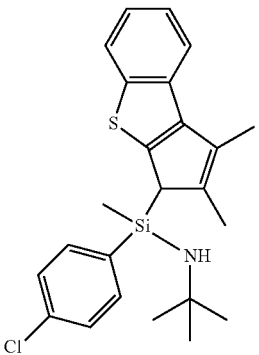
[Formula 2-8]
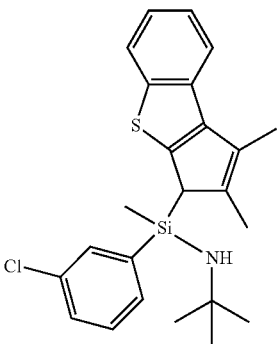

[Formula 2-9]

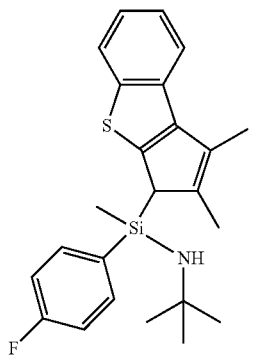

[Formula 2-10]

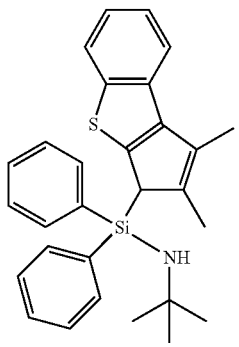

The ligand compound represented by Formula 2 of the present invention may be prepared as shown in the following Reaction Scheme 1.

[Reaction Scheme 1]

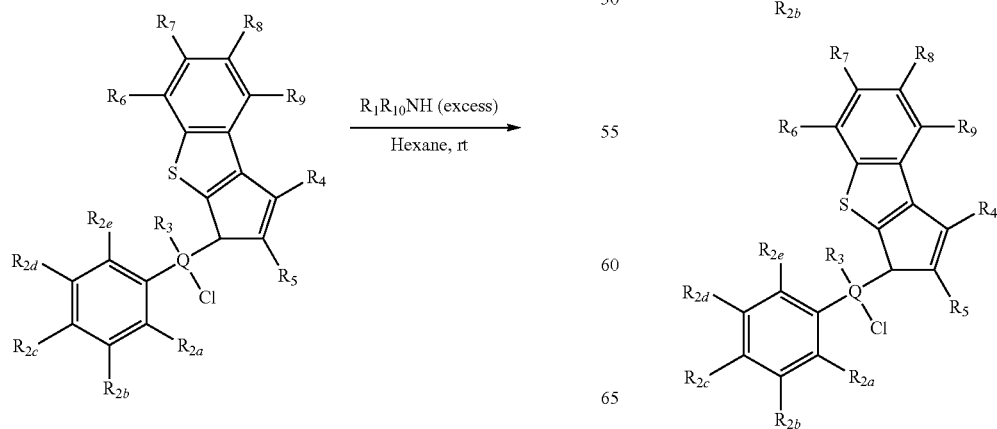

-continued

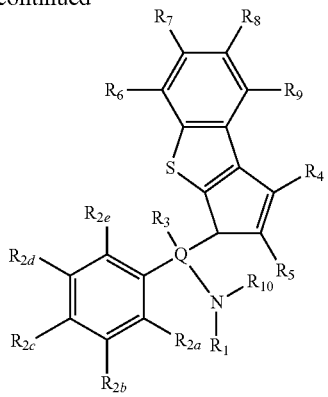

In Reaction Scheme 1, $R_1$ to $R_{10}$ and Q are the same as defined in Formula 2.

Specifically, a method of preparing a ligand compound of Formula 2 may include steps of a) reacting a compound represented by the following Formula 4 with a compound represented by the following Formula 5 to prepare a compound represented by the following Formula 3; and b) reacting a compound represented by the following Formula 3 with a compound represented by the following Formula 6 to prepare a compound represented by the following Formula 2.

[Formula 4]

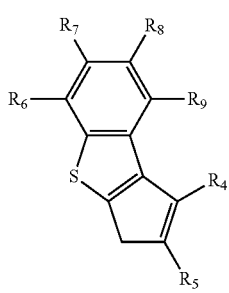

[Formula 5]

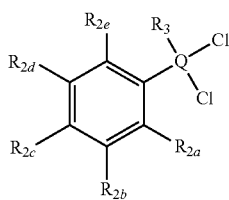

[Formula 3]

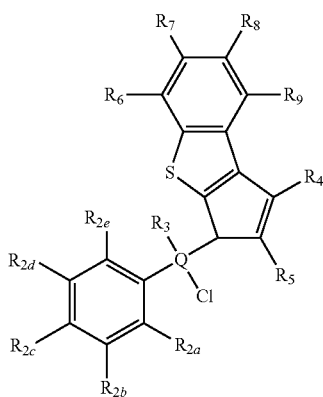

-continued

[Formula 6]

$R_1R_{10}NH$

[Formula 2]

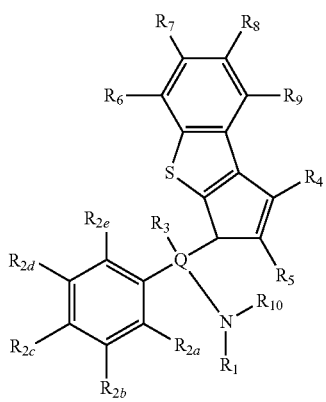

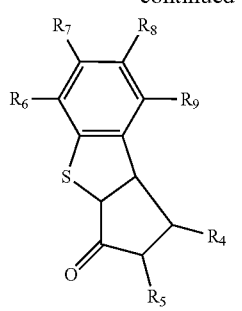

In the Formulae, $R_1$ to $R_{10}$ and Q are the same as defined in Formula 2.

In Step a) of reacting a compound represented by the following Formula 4 with a compound represented by the following Formula 5 to prepare a compound represented by the following Formula 3, the compound represented by Formula 4 and the compound represented by Formula 5 may be reacted in a molar ratio of 1:0.8 to 1:5.0, specifically 1:0.9 to 1:4.0, and more specifically, 1:1 to 1:3.0.

Further, the reaction may be carried out at a temperature ranging from −80° C. to 140° C. for 1 hour to 48 hours.

Further, in Step b) of reacting a compound represented by the following Formula 3 with a compound represented by the following Formula 6 to prepare a compound represented by the following Formula 2, the compound represented by Formula 3 and the compound represented by Formula 6 may be reacted in a molar ratio of 1:0.8 to 1:5.0, specifically 1:0.9 to 1:4.5, and more specifically, 1:1 to 1:4.0.

The compound represented by Formula 4 may be prepared as shown in Reaction Scheme 2.

[Reaction Scheme 2]

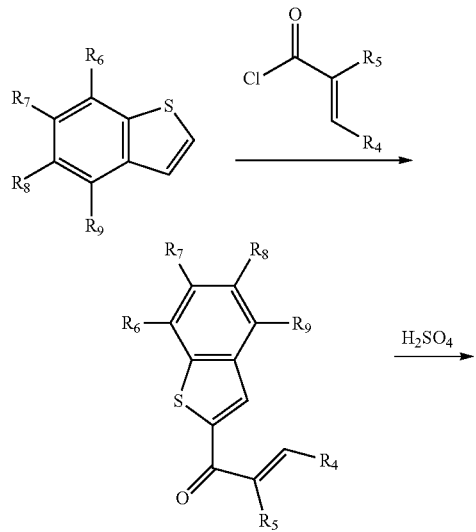

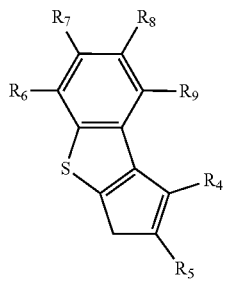

Formula 4

In Reaction Scheme 2, $R_4$ to $R_9$ are the same as defined in Formula 1 or Formula 2.

The transition metal compound represented by Formula 1 of the present invention may be prepared by using the ligand compound represented by Formula 2 as shown in the following Reaction Scheme 3.

[Reaction Scheme 3]

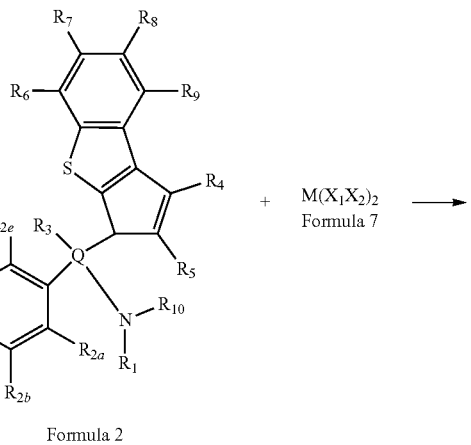

Formula 2

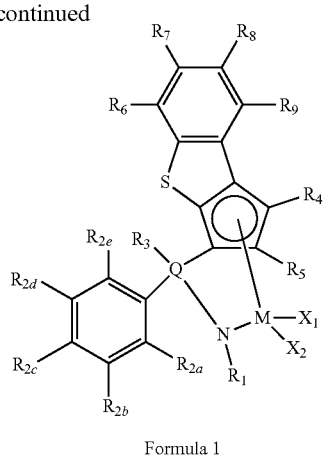

Formula 1

In the Formulas, $R_1$ to $R_{10}$, Q, M, $X_1$ and $X_2$ are the same as defined in Formula 1 or Formula 2.

According to an embodiment of the present invention, the transition metal compound represented by Formula 1 may be a compound in which a Group 4 transition metal is coordinated to the compound represented by Formula 2 as a ligand.

Specifically, as shown in Reaction Scheme 3, the compound represented by Formula 2 is reacted with a compound represented by Formula 7, which is a metal precursor, and an organolithium compound, and thus the transition metal compound of Formula 1 in which a Group 4 transition metal is coordinated to the compound represented by Formula 2 as a ligand may be obtained.

[Formula 2]

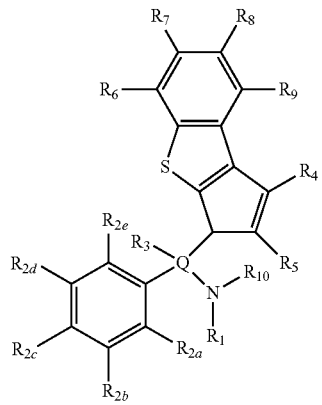

$M(X_1X_2)_2$      [Formula 7]

[Formula 1]

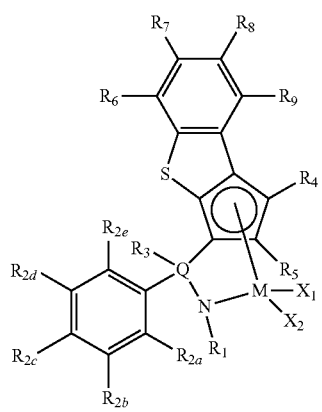

In the Formulas, $R_1$ to $R_{10}$, Q, M, $X_1$ and $X_2$ are the same as defined in Formula 1.

In Reaction Scheme 3, the organolithium compound may be one or more selected from the group consisting of n-butyl lithium, sec-butyl lithium, methyl lithium, ethyl lithium, isopropyl lithium, cyclohexyl lithium, allyl lithium, vinyl lithium, phenyl lithium and benzyl lithium.

The compound represented by Formula 2 and the compound represented by Formula 7 may be mixed in a molar ratio of 1:0.8 to 1:1.5, and preferably 1:1.0 to 1:1.1.

Further, the organolithium compound may be used in an amount of 180 to 250 parts by weight based on 100 parts by weight of the compound represented by Formula 2.

The reaction may be carried out at a temperature in the range of −80° C. to 140° C. for 1 hour to 48 hours.

The transition metal compound of Formula 1 may be used alone or in combination including one or more cocatalyst compounds represented by the following Formula 8, Formula 9 and Formula 10 in addition to the transition metal compound of Formula 1 as a catalyst for the polymerization reaction.

$—[Al(R_{11})—O]_a—$      [Formula 8]

$A(R_{11})_3$      [Formula 9]

$[L-H]^+[W(D)_4]^-$ or $[L]^+[W(D)_4]^-$      [Formula 10]

In Formulae 8 to 10, $R_{11}$ may be the same or different, and each independently selected from the group consisting of a halogen, a hydrocarbyl having 1 to 20 carbon atoms, and a hydrocarbyl having 1 to 20 carbon atoms substituted with a halogen, A is aluminum or boron, D is independently an aryl having 6 to 20 carbon atoms or an alkyl having 1 to 20 carbon atoms in which at least one hydrogen atom may be substituted with a substituent, and here, the substituent is at least any one selected from the group consisting of a halogen, a hydrocarbyl having 1 to 20 carbon atoms, an alkoxy having 1 to 20 carbon atoms, and an aryloxy having 6 to 20 carbon atoms, H is a hydrogen atom, L is a neutral or cationic Lewis acid, W is a Group 13 element, a is an integer of 2 or more.

Examples of the compound represented by Formula 8 include alkylaluminoxanes such as methylaluminoxane (MAO), ethylaluminoxane, isobutylaluminoxane, butylaluminoxane and the like, and modified alkyl aluminoxanes having two or more of the alkylaluminoxanes mixed therein, and specifically may be methyl aluminoxane and modified methyl aluminoxane (MAO).

Examples of the compound represented by Formula 9 include trimethylaluminum, triethylaluminum, triisobutylaluminum, tripropylaluminum, tributylaluminum, dimethylchloroaluminum, tri-iso-propyl aluminum, tri-sec-butyl aluminum, tricyclopentyl aluminum, tripentyl aluminum, triisopentyl aluminum, trihexyl aluminum, trioctyl aluminum, ethyldimethyl aluminum, methyldiethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron and the like, and specifically, may be selected from trimethyl aluminum, triethyl aluminum and triisobutyl aluminum.

Examples of the compound represented by Formula 10 include triethyl ammonium tetraphenylboron, tributylammonium tetraphenylboron, trimethylammonium tetraphenylboron, tripropylammonium tetraphenylboron, trimethylammonium tetra(p-tolyl) boron, trimethylammonium tetra (o,p-dimethylphenyl) boron, tributylammonium tetra(p-trifluoromethylphenyl) boron, trimethylammonium tetra(p-trifluoromethylphenyl) boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, dimethylanilinium tetrakis(pentafluorophenyl) borate, triethylammonium tetraphenyl aluminum, tributylammonium tetraphenyl aluminum, trimethylammonium tetraphenyl aluminum, tripropylammonium tetraphenyl aluminum, trimethylammonium tetra(p-tolyl) aluminum, tripropylammonium tetra(p-tolyl) aluminum, triethylammoniumtetra (o,p-dimethylphenyl) aluminum, tributylammonium tetra(p-trifluoromethylphenyl) aluminum, trimethylammonium tetra(p-trifluoromethylphenyl) aluminum, tributylammonium tetrapentafluorophenyl aluminum, N,N-diethylanilinium tetraphenyl aluminum, N,N-diethylanilinium tetrapentafluorophenyl aluminum, diethylammonium tetrapentafluorophenyl aluminum, triphenylphosphonium tetraphenyl aluminum, trimethylphosphonium tetraphenyl aluminum, tripropylammonium tetra(p-tolyl) boron, triethylammonium tetra(o,p-dimethylphenyl) boron, triphenylcarbonium tetra(p-trifluoromethylphenyl) boron, triphenylcarbonium tetrapentafluorophenylboron and the like.

The catalyst composition may be prepared by a method including 1) bringing a transition metal compound represented by Formula 1 into contact with a compound represented by Formula 8 or 9 to obtain a mixture; and 2) adding a compound represented by Formula 10 to the mixture, as the first method.

Further, the catalyst composition may be prepared by a method of bringing a transition metal compound represented by Formula 1 into contact with a compound represented by Formula 8, as the second method.

In the first method among the above-described preparation methods of the catalyst composition, the molar ratio of the transition metal compound represented by Formula 1/the compound represented by Formula 8 or 9 may be in the range of 1/5,000 to 1/2, specifically in the range of 1/1000 to 1/10, and more specifically in the range of 1/500 to 1/20. When the molar ratio of the transition metal compound represented by Formula 1/the compound represented by Formula 8 or 9 exceeds 1/2, the amount of the alkylating agent is very small, and thus the alkylation of the metal compound is not fully carried out. When the molar ratio is less than 1/5000, the alkylation of the metal compound is carried out, but the activation of the alkylated metal compound is not fully achieved due to the side reaction between the remaining excess alkylating agent and the activating agent which is a compound of Formula 10. Further, the molar ratio of the transition metal compound represented by Formula 1/the compound represented by Formula 10 may be in the range of 1/25 to 1, specifically in the range of 1/10 to 1, and more specifically in the range of 1/5 to 1. When the molar ratio of the transition metal compound represented by Formula 1/the compound represented by Formula 10 is more than 1, the amount of the activator is relatively small, so that the metal compound is not fully activated, and thus the activity of the resulting catalyst composition may be lowered. When the molar ratio is less than 1/25, the activation of the metal compound is fully performed, but the unit cost of the catalyst composition may not be economical due to the remaining excess activator, or the purity of the produced polymer may be lowered.

In the second method among the above-described preparation methods of the catalyst composition, the molar ratio of the transition metal compound represented by Formula 1/the compound represented by Formula 8 may be in the range of 1/10,000 to 1/10, and specifically in the range of 1/5,000 to 1/100, and more specifically in the range of 1/3,000 to 1/500. When the molar ratio is more than 1/10, the amount of the activator is relatively small, so that the activation of the metal compound is not fully achieved, and thus the activity of the resulting catalyst composition may be lowered. When the molar ratio is less than 1/10,000, the activation of the metal compound is fully performed, but the unit cost of the catalyst composition may not be economical due to the remaining excess activator, or the purity of the produced polymer may be lowered.

In the preparation of the catalyst composition, a hydrocarbon-based solvent such as pentane, hexane, heptane or the like, or an aromatic solvent such as benzene, toluene or the like may be used as a reaction solvent.

Further, the catalyst composition may include the transition metal compound and a cocatalyst compound in the form of being supported on a carrier.

The carrier may be used without any particular limitation as long as it is used as a carrier in a metallocene catalyst. Specifically, the carrier may be silica, silica-alumina, silica-magnesia or the like, and any one or a mixture of two or more thereof may be used.

In the case where the support is silica, there are few catalysts liberated from the surface during the olefin polymerization process since the silica carrier and the functional groups of the metallocene compound of Formula 1 form a chemical bond. As a result, it is possible to prevent the occurrence of fouling of the wall surface of the reactor or the polymer particles entangled with each other during the preparation process of the olefin-based polymer. Further, the olefin-based polymer prepared in the presence of the catalyst containing the silica carrier has an excellent particle shape and apparent density of the polymer.

More specifically, the carrier may be high-temperature dried silica or silica-alumina containing a siloxane group having high reactivity on the surface through a method such as high-temperature drying.

The carrier may further include an oxide, carbonate, sulfate or nitrate component such as $Na_2O$, $K_2CO_3$, $BaSO_4$, $Mg(NO_3)_2$ or the like.

The polymerization reaction for polymerizing the olefin-based monomer may be carried out by a conventional process applied to the polymerization of olefin monomers such as continuous solution polymerization, bulk polymerization, suspension polymerization, slurry polymerization, emulsion polymerization or the like.

The polymerization reaction of olefin monomers may be carried out in the presence of an inert solvent, and examples of the inert solvent include benzene, toluene, xylene, cumene, heptane, cyclohexane, methylcyclohexane, methylcyclopentane, n-hexane, 1-hexene and 1-octene, but the present invention is not limited thereto.

The polymerization of the olefin-based polymer may be carried out by reacting at a temperature of about 25° C. to about 500° C. and a pressure of about 1 $kgf/cm^2$ to about 100 $kgf/cm^2$.

Specifically, the polymerization of the polyolefin may be carried out at a temperature of from about 25° C. to about 500° C., and specifically at a temperature in the range of 80°

C. to 250° C., and more preferably in the range of 100° C. to 200° C. Further, the reaction pressure at the time of polymerization may be in the range of 1 kgf/cm² to 150 kgf/cm², preferably 1 kgf/cm² to 120 kgf/cm², and more preferably 5 kgf/cm² to 100 kgf/cm².

Due to having improved physical properties, the olefin-based polymer of the present invention may be used for blow molding, extrusion molding or injection molding in diverse fields and uses including wrapping, construction, daily supplies, or the like, such as a material of an automobile, a wire, a toy, a fiber, a medicine, or the like. Particularly, the olefin-based polymer may be used for an automobile which requires excellent impact strength.

Further, the olefin-based polymer of the present invention may be usefully used in the production of molded articles.

The molded article may particularly include a blow molded article, an inflation molded article, a cast molded article, an extrusion laminate molded article, an extrusion molded article, a foamed molded article, an injection molded article, a sheet, a film, a fiber, a monofilament, a non-woven fabric, or the like.

MODE FOR CARRYING OUT THE INVENTION

Examples

Hereinafter, the present invention will be explained in particular with reference to the following examples. However, the following examples are illustrated to assist the understanding of the present invention, and the scope of the present invention is not limited thereto.

Preparation Example 1: Preparation of Transition Metal Compound 1

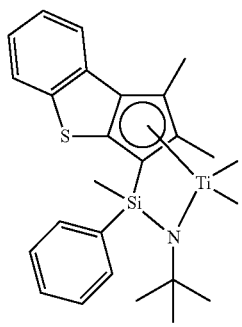

Synthesis of N-tert-butyl-1-(1,2-dimethyl-3H-benzo[b]cyclopenta[d]thiophen-3-yl)-1,1-(methyl) (phenyl) silane amine of Formula 2-4

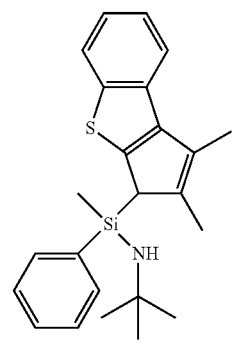

Formula 2-4

Preparation of chloro-1-(1,2-dimethyl-3H-benzo[b]cyclopenta[d]thiophen-3-yl)-1,1-(methyl) (phenyl) silane 10 g (1.0 eq, 49.925 mmol) of 1,2-dimethyl-3H-benzo[b]cyclopenta[d] thiophene and 100 ml of THF were put into a 250 ml Schlenk flask, and 22 ml of n-BuLi (1.1 eq, 54.918 mmol, 2.5 M in hexane) was added dropwise at −30° C., followed by stirring at room temperature for 3 hours. The stirred Li-complex THF solution was cannulated at −78° C. to a Schlenk flask containing 8.1 ml (1.0 eq, 49.925 mmol) of dichloro(methyl) (phenyl)silane and 70 ml of THF, and stirred overnight at room temperature. After stirring and vacuum drying, a mixture was extracted with 100 ml of hexane.

Preparation of N-tert-butyl-1-(1,2-dimethyl-3H-benzo[b]cyclopenta[d]thiophen-3-yl)-1,1-(methyl) (phenyl)silane amine 42 ml (8 eq, 399.4 mmol) of t-BuNH₂ was introduced into 100 ml of the extracted chloro-1-(1,2-dimethyl-3H-benzo[b]cyclopenta[d]thiophen3-yl)-1,1-(methyl) (phenyl)silane hexane solution at room temperature, followed by stirring overnight at room temperature. After stirring and vacuum drying, a mixture was extracted using 150 ml of hexane. After drying the solvent, 13.36 g (68%, dr=1:1) of a yellow solid was obtained.

$^1$H NMR (CDCl₃, 500 MHz): δ 7.93 (t, 2H), 7.79 (d, 1H), 7.71 (d, 1H), 7.60 (d, 2H), 7.48 (d, 2H), 7.40~7.10 (m, 10H, aromatic), 3.62 (s, 1H), 3.60 (s, 1H), 2.28 (s, 6H), 2.09 (s, 3H), 1.76 (s, 3H), 1.12 (s, 18H), 0.23 (s, 3H), 0.13 (s, 3H)

<Synthesis of Transition of Metal Compound 1>

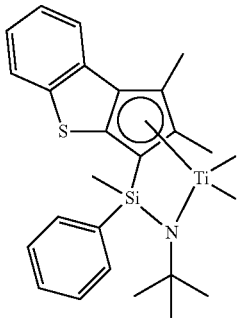

4.93 g (12.575 mmol, 1.0 eq) of the ligand compound of Formula 2-4 and 50 ml (0.2 M) of toluene were put into a 100 ml Schlenk flask, and 10.3 ml (25.779 mmol, 2.05 eq, 2.5 M in hexane) of n-BuLi was added dropwise at −30° C., followed by stirring at room temperature overnight. After stirring, 12.6 ml (37.725 mmol, 3.0 eq., 3.0 M in diethyl ether) of MeMgBr was added dropwise, and then 13.2 ml (13.204 mmol, 1.05 eq, 1.0 M in toluene) of TiCl$_4$ was added and stirred overnight at room temperature. After stirring and vacuum drying, the mixture was extracted with 150 ml of hexane, and the solvent was removed to 50 ml. 4 ml (37.725 mmol, 3.0 eq) of DME was added dropwise thereto, followed by stirring at room temperature overnight. After vacuum drying again, a mixture was extracted with 150 ml of hexane. After drying the solvent, 2.23 g (38%, dr=1:0.5) of a brown solid was obtained.

$^1$H NMR (CDCl$_3$, 500 MHz): δ 7.98 (d, 1H), 7.94 (d, 1H), 7.71 (t, 6H), 7.50~7.30 (10H), 2.66 (s, 3H), 2.61 (s, 3H), 2.15 (s, 3H), 1.62 (s, 9H), 1.56 (s, 9H), 1.53 (s, 3H), 0.93 (s, 3H), 0.31 (s, 3H), 0.58 (s, 3H), 0.51 (s, 3H), −0.26 (s, 3H), −0.39 (s, 3H)

Preparation Example 2: Preparation of Transition Metal Compound 2

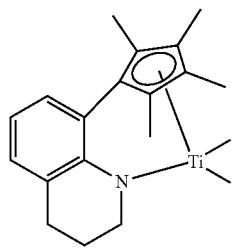

(1) Preparation of (8-(2,3,4,5-tetramethyl-1,3-cyclopentadienyl)-1,2,3,4-tetrahydroquinoline)

(i) Preparation of Lithium Carbamate 1,2,3,4-tetrahydroquinoline (13.08 g, 98.24 mmol) and diethyl ether (150 mL) were put into a Schlenk flask. The Schlenk flask was immersed in a −78° C. low temperature bath formed of dry ice and acetone, and stirred for 30 minutes. Subsequently, n-BuLi (39.3 mL, 2.5 M, 98.24 mmol) was added via a syringe under a nitrogen atmosphere, and a pale yellow slurry was formed. Then, after the flask was stirred for 2 hours, the temperature of the flask was raised to room temperature while removing the produced butane gas. The flask was immersed again in a low-temperature bath at −78° C., the temperature was lowered, and then CO$_2$ gas was introduced. As the carbon dioxide gas was introduced, the slurry disappeared and became a clear solution. The flask was connected to a bubbler to remove the carbon dioxide gas, and a temperature was raised to room temperature. Thereafter, an excess amount of CO$_2$ gas and a solvent were removed under vacuum. The flask was transferred to a dry box, and pentane was added thereto, followed by vigorous stirring and filtration to obtain lithium carbamate which is a white solid compound. The white solid compound was coordinated with diethyl ether. The yield was 100%.

$^1$H NMR (C$_6$D$_6$, C$_5$D$_5$N): δ 1.90 (t, J=7.2 Hz, 6H, ether), 1.50 (br s, 2H, quin-CH$_2$), 2.34 (br s, 2H, quin-CH$_2$), 3.25 (q, J=7.2 Hz, 4H, ether), 3.87 (br, s, 2H, quin-CH$_2$), 6.76 (br d, J=5.6 Hz, 1H, quin-CH) ppm $^{13}$C NMR (C$_6$D$_6$): δ 24.24, 28.54, 45.37, 65.95, 121.17, 125.34, 125.57, 142.04, 163.09 (C=O) ppm (ii) Preparation of 8-(2,3,4,5-tetramethyl-1,3-cyclopentadienyl)-1,2,3,4-tetrahydroquinoline

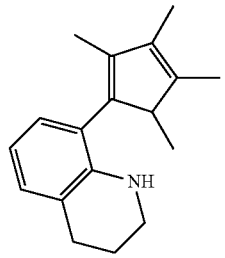 [SMILES: CC1=C(C)C(C)C(c2cccc3c2NCCC3)=C1C]

The lithium carbamate compound prepared in Step (i) (8.47 g, 42.60 mmol) was put into a Schlenk flask. Subsequently, tetrahydrofuran (4.6 g, 63.9 mmol) and 45 mL of diethyl ether were added in sequence. The Schlenk flask was immersed in a low-temperature bath at −20° C. formed of acetone and a small amount of dry ice and stirred for 30 minutes, and then t-BuLi (25.1 mL, 1.7 M, 42.60 mmol) was added thereto. At this time, the color of the reaction mixture turned red. The mixture was stirred for 6 hours while the temperature was maintained at −20° C. A CeCl$_3$.2LiCl solution (129 mL, 0.33 M, 42.60 mmol) dissolved in tetrahydrofuran and tetramethylcyclopentinone (5.89 g, 42.60 mmol) were mixed in a syringe, and then charged into the flask under a nitrogen atmosphere. The temperature of the flask was slowly raised to room temperature. After 1 hour, a thermostat was removed, and a temperature was maintained at room temperature. Subsequently, water (15 mL) was added to the flask, and ethyl acetate was added thereto, followed by filtration to obtain a filtrate. The filtrate was transferred to a separatory funnel, followed by the addition of hydrochloric acid (2 N, 80 mL) and shaking for 12 minutes. Then, a saturated aqueous solution of sodium hydrogencarbonate (160 mL) was added thereto for neutralization, and then an organic layer was extracted. Anhydrous magnesium sulfate was added to the organic layer to remove moisture, followed by filtration, and the filtrate was taken to remove the solvent. The obtained filtrate was purified by column chromatography using hexane and ethyl acetate (v/v, 10:1) to obtain a yellow oil. The yield was 40%.

¹H NMR (C₆D₆): δ 1.00 (br d, 3H, Cp-CH₃), 1.63-1.73 (m, 2H, quin-CH₂), 1.80 (s, 3H, Cp-CH₃), 1.81 (s, 3H, Cp-CH₃), 1.85 (s, 3H, Cp-CH₃), 2.64 (t, J=6.0 Hz, 2H, quin-CH₂), 2.84-2.90 (br, 2H, quin-CH₂), 3.06 (br s, 1H, Cp-H), 3.76 (br s, 1H, N—H), 6.77 (t, J=7.2 Hz, 1H, quin-CH), 6.92 (d, J=2.4 Hz, 1H, quin-CH), 6.94 (d, J=2.4 Hz, 1H, quin-CH) ppm (2) Preparation of [(1,2,3,4-tetrahydroquinolin-8-yl) tetramethylcyclopentadienyl-eta5,kappa-N]titanium dimethyl

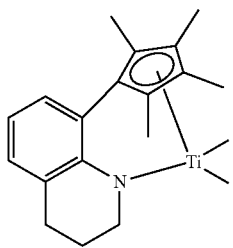

(i) Preparation of [(1,2,3,4-tetrahydroquinoline-8-yl) tetramethylcyclopentadienyl-η5, κ-N]di-lithium Compound In a dry box, 8-(2,3,4,5-tetramethyl-1,3-cyclopentadienyl)-1,2,3,4-tetrahydroquinoline (8.07 g, 32.0 mmol) prepared in Step (1) and 140 mL of diethyl ether were put into a round flask, a temperature was lowered to −30° C., and n-BuLi (17.7 g, 2.5 M, 64.0 mmol) was slowly added thereto while stirring. The reaction was allowed to proceed for 6 hours while the temperature was raised to room temperature. Thereafter, a solid was obtained by filtration while washing with diethyl ether several times. A vacuum was applied to remove the remaining solvent to obtain a di-lithium compound (9.83 g) which is a yellow solid. The yield was 95%.

¹H NMR (C₆D₆, C₅D₅N): δ 2.38 (br s, 2H, quin-CH₂), 2.53 (br s, 12H, Cp-CH₃), 3.48 (br s, 2H, quin-CH₂), 4.19 (br s, 2H, quin-CH₂), 6.77 (t, J=6.8 Hz, 2H, quin-CH), 7.28 (br s, 1H, quin-CH), 7.75 (brs, 1H, quin-CH) ppm (ii) Preparation of (1,2,3,4-tetrahydroquinoline-8-yl) tetramethylcyclopentadienyl-η5,κ-N]titanium dimethyl In a dry box, TiCl₄.DME (4.41 g, 15.76 mmol) and diethyl ether (150 mL) were put into a round flask, and MeLi (21.7 mL, 31.52 mmol, 1.4 M) was slowly added thereto while stirring at −30° C. After stirring for 15 minutes, the [(1,2,3,4-tetrahydroquinoline-8-yl) tetramethylcyclopentadienyl-η5, κ-N]di lithium compound prepared in Step (i) (5.30 g, 15.76 mmol) was placed in the flask. A mixture was stirred for 3 hours while a temperature was raised to room temperature. After completion of the reaction, a vacuum was applied to remove the solvent, and the mixture was dissolved in pentane, and filtered to remove the filtrate. A vacuum was applied to remove the pentane to obtain a dark brown compound (3.70 g). The yield was 71.3%.

¹H NMR (C₆D₆): δ 0.59 (s, 6H, Ti—CH₃), 1.66 (s, 6H, Cp-CH₃), 1.69 (br t, J=6.4 Hz, 2H, quin-CH₂), 2.05 (s, 6H, Cp-CH₃), 2.47 (t, J=6.0 Hz, 2H, quin-CH₂), 4.53 (m, 2H, quin-CH₂), 6.84 (t, J=7.2 Hz, 1H, quin-CH), 6.93 (d, J=7.6 Hz, quin-CH), 7.01 (d, J=6.8 Hz, quin-CH) ppm ¹³C NMR (C₆D₆): δ 12.12, 23.08, 27.30, 48.84, 51.01, 119.70, 119.96, 120.95, 126.99, 128.73, 131.67, 136.21 ppm Example 1

A 1.5 L autoclave continuous reactor was charged with a hexane solvent (5 kg/h) and 1-butene (1.2 kg/h), and then the temperature at the top of the reactor was preheated to 150° C. A triisobutyl aluminum compound (33.6 mmol/min), the transition metal compound 1 (0.3 μmol/min) obtained in Preparation Example 1 as a catalyst, and a dimethylanilinium tetrakis(pentafluorophenyl) borate cocatalyst (0.070 μmol/min) were simultaneously introduced into the reactor. Subsequently, ethylene (0.87 kg/h) was then charged into the autoclave reactor, and the copolymerization reaction was continued at 150° C. for 30 minutes or more in a continuous process at a pressure of 89 bar to obtain a copolymer. After drying for more than 12 hours, the physical properties were measured.

Examples 2 to 9

A copolymer was prepared in the same manner as in Example 1, except that the content of each substance was changed as shown in the following Table 1.

Comparative Examples 1 to 3

A copolymer was prepared in the same manner as in Example 1, except that the transition metal compound 2 obtained in Preparation Example 2 was used instead of the transition metal compound 1 as a catalyst, and the content of each substance was changed as shown in the following Table 1.

Comparative Examples 4 and 5

In Comparative Examples 4 and 5, LC170 and LC180 of LG Chem Ltd. were purchased and used respectively.

TABLE 1

|  | Catalyst (μmol/min) | Cocatalyst (μmol/min) | TiBAl (mmol/min) | Ethylene (kg/h) | 1-butene (kg/h) | 1-octene (kg/h) | Reaction temperture (° C.) |
|---|---|---|---|---|---|---|---|
| Example 1 | 0.30 | 0.90 | 0.070 | 0.87 | 1.20 | — | 185 |
| Example 2 | 1.05 | 0.6 | 1.3 | 0.87 | 0.35 | — | 184 |
| Example 3 | 0.75 | 0.6 | 1.05 | 0.87 | 0.25 | — | 156 |
| Example 4 | 0.87 | 5.0 | 0.9 | 0.87 | 0.5 | — | 190 |

TABLE 1-continued

|  | Catalyst (μmol/min) | Cocatalyst (μmol/min) | TiBAl (mmol/min) | Ethylene (kg/h) | 1-butene (kg/h) | 1-octene (kg/h) | Reaction temperture (° C.) |
|---|---|---|---|---|---|---|---|
| Example 5 | 0.25 | 0.75 | 0.05 | 0.87 | 1.2 | — | 194 |
| Example 6 | 0.45 | 1.35 | 0.05 | 0.87 | 1.2 | — | 177 |
| Example 7 | 0.33 | 0.99 | 0.05 | 0.87 | 1.2 | — | 185 |
| Example 8 | 0.30 | 0.90 | 0.070 | 0.87 | — | 1.00 | 175 |
| Example 9 | 0.30 | 0.90 | 0.070 | 0.87 | — | 1.40 | 182 |
| Comparative Example 1 | 0.90 | 2.70 | 0.060 | 0.87 | 0.58 | — | 160 |
| Comparative Example 2 | 1.95 | 0.06 | 0.85 | 0.87 | 0.65 | — | 170.3 |
| Comparative Example 3 | 1.56 | 0.6 | 0.65 | 0.87 | 0.52 | — | 145.8 |

Experimental Example 1

The physical properties of the copolymers of Examples 1 to 9 and Comparative Examples 1 to 5 were evaluated according to the following methods, and the results are shown in the following Table 2.
1) Density of Polymer
Measurement was performed in accordance with ASTM D-792.
2) Melt Index (MI) of Polymer
Measurement was performed in accordance with ASTM D-1238 [condition E, (190° C. and a load of 2.16 kg)].
3) Weight Average Molecular Weight (Mw, g/mol), Number Average Molecular Weight (Mn, g/mol), Z+1 Average Molecular Weight (Mz+1, g/mol) and Molecular Weight Distribution (MWD)
The weight average molecular weight (Mw, g/mol), the number average molecular weight (Mn, g/mol), and the Z+1 average molecular weight (Mz+1, g/mol) each were measured by gel permeation chromatography (GPC), and the molecular weight distribution was calculated by dividing the weight average molecular weight by the number average molecular weight.
Column: PL Olexis
Solvent: Trichlorobenzene (TCB)
Flow rate: 1.0 ml/min
Concentration of specimen: 1.0 mg/ml
Injection amount: 200 μl
Column temperature: 160° C.
Detector: Agilent High Temperature RI detector
Standard: Polystyrene (Calibration using cubic function)

4) 1-Octene and 1-Butene Content
1-Octene and 1-Butene content were measured by NMR. 1H-NMR was measured at a condition of ns=16, d1=3s, solvent=TCE-d2, 373K, and then a TCE-d2 solvent peak was corrected by 6.0 ppm. a peak of $CH_3$ of 1-butene at 0.92 ppm and a peak relating to the $CH_3$ of 1-octene (triplet) at 0.96 ppm were identified, and then the contents were calculated.

TABLE 2

|  | Density (g/mL) | MI (g/10 min) | % [1-C8] (wt %) | % [1-C4] (wt %) | Mn (g/mol) | Mw (g/mol) | Mz + 1 (g/mol) | MWD | $\frac{Mn}{Mz+1} *100$ |
|---|---|---|---|---|---|---|---|---|---|
| Example 1 | 0.868 | 3.6 | — | 27.3 | 37332 | 77074 | 234482 | 2.06 | 15.9 |
| Example 2 | 0.863 | 5.7 | — | 34.9 | 33336 | 69738 | 180383 | 2.09 | 18.5 |
| Example 3 | 0.862 | 1.2 | — | 35.0 | 55426 | 112552 | 331726 | 2.03 | 16.7 |
| Example 4 | 0.867 | 8.1 | — | 29.6 | 30514 | 62633 | 194668 | 2.05 | 15.7 |
| Example 5 | 0.866 | 2.7 | — | 28.3 | 42308 | 86341 | 277895 | 2.04 | 15.2 |
| Example 6 | 0.860 | 14 | — | 32.4 | 26836 | 56456 | 172510 | 2.10 | 15.6 |
| Example 7 | 0.865 | 4.9 | — | 29.0 | 31241 | 69268 | 198930 | 2.22 | 15.7 |
| Example 8 | 0.880 | 0.3 | 25.6 | — | 62617 | 132916 | 411437 | 2.12 | 15.2 |
| Example 9 | 0.869 | 1.4 | 31.5 | — | 52849 | 109583 | 341620 | 2.07 | 15.5 |
| Comparative Example 1 | 0.868 | 2.7 | — | 25.4 | 31157 | 72329 | 233025 | 2.32 | 13.4 |
| Comparative Example 2 | 0.864 | 6.3 | — | 32.1 | 29090 | 66491 | 206247 | 2.29 | 14.1 |
| Comparative Example 3 | 0.862 | 1.3 | — | 32.9 | 47691 | 106205 | 331126 | 2.23 | 14.4 |
| Comparative Example 4 | 0.867 | 1.1 | 35.6 | — | 45295 | 104495 | 312682 | 2.31 | 14.5 |
| Comparative Example 5 | 0.884 | 1.17 | 26.0 | — | 46222 | 108718 | 321910 | 2.35 | 14.4 |

Experimental Example 2

The tensile strengths of the copolymers of Examples 1 to 3 and 9, and Comparative Examples 1 to 4 were measured in accordance with ASTM D-638. At this time, the test speed was 500 mm/min, and the average value was measured 10 times per one specimen.

TABLE 3

|  | Density (g/mL) | MI (g/10 min) | Mn (g/mol) | Mw (g/mol) | Mz + 1 (g/mol) | MWD | $\frac{Mn}{Mz+1} * 100$ |
|---|---|---|---|---|---|---|---|
| Example 1 | 0.868 | 3.6 | 37332 | 77074 | 234482 | 2.06 | 15.9 |
| Comparative Example 1 | 0.868 | 2.7 | 31157 | 72329 | 233025 | 2.32 | 13.4 |
| Example 2 | 0.863 | 5.7 | 33336 | 69738 | 180383 | 2.09 | 18.5 |
| Comparative Example 2 | 0.864 | 6.3 | 29090 | 66491 | 206247 | 2.29 | 14.1 |
| Example 3 | 0.862 | 1.2 | 55426 | 112552 | 331726 | 2.03 | 16.7 |
| Comparative Example 3 | 0.862 | 1.3 | 47691 | 106205 | 331126 | 2.23 | 14.4 |
| Example 9 | 0.869 | 1.4 | 52849 | 109583 | 341620 | 2.07 | 15.5 |
| Comparative Example 4 | 0.867 | 1.1 | 45295 | 104495 | 312682 | 2.31 | 14.5 |

In Table 3, Examples were paired with Comparative Examples in which the type of comonomer, density and MI value were the same or similar respectively, and then the tensile strengths were compared with each other. Referring to Table 3 above, the copolymers of the Examples are more resistant and have excellent a tensile strength when tensioned to elongate because the copolymers of the Examples are adjusted to have a larger Mw and Mz+1 than the copolymers of the Comparative Examples.

The invention claimed is:

1. An olefin-based polymer, which has (1) a density (d) ranging from 0.85 to 0.89 g/cc, measured according to ASTM D-792, (2) a melt index (MI) ranging from 0.1 g/10 min to 15 g/10 min, measured at 190° C., 2.16 kg load conditions, (3) a molecular weight distribution (MWD) in a range of 1.0 to 3.0, and (4) a number average molecular weight (Mn) and a Z+1 average molecular weight (Mz+1) satisfying the following Equation 1:

$$\{Mn/(Mz+1)\} \times 100 > 15, \quad \text{[Equation 1]}$$

wherein the olefin-based polymer is a copolymer of ethylene and an alpha-olefin comonomer having 3 to 12 carbon atoms.

2. The olefin-based polymer according to claim 1, wherein the olefin-based polymer has (5) a weight average molecular weight (Mw) in a range of 10,000 g/mol to 500,000 g/mol.

3. The olefin-based polymer according to claim 1, wherein the olefin-based polymer has (6) a number average molecular weight (Mn) in the range of 8,000 g/mol to 300,000 g/mol.

4. The olefin-based polymer according to claim 1, wherein the olefin-based polymer has (7) a Z+1 average molecular weight (Mz+1) in a range of 50,000 g/mol to 1,500,000 g/mol.

5. The olefin-based polymer according to claim 1, wherein the olefin-based polymer has (7) a Z+1 average molecular weight (Mz+1) in a range of 80,000 g/mol to 1,000,000 g/mol.

6. The olefin-based polymer according to claim 1, wherein the olefin-based polymer has (8) $I_{10}/I_2 > 7.91$ $(MI_{2.16})^{-0.188}$.

7. The olefin-based polymer according to claim 1, wherein the alpha-olefin comonomer includes any one or a mixture of two or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene.

8. The olefin-based polymer according to claim 1, wherein the alpha-olefin comonomer is comprised in an amount of from 5 wt % to 40 wt %, with respect to a total weight of the copolymer.

9. The olefin-based polymer according to claim 1, wherein the olefin-based polymer is obtained by a preparation method including a step of polymerizing an olefin-based monomer in the presence of a catalyst composition for olefin polymerization including a transition metal compound represented by the following Formula 1:

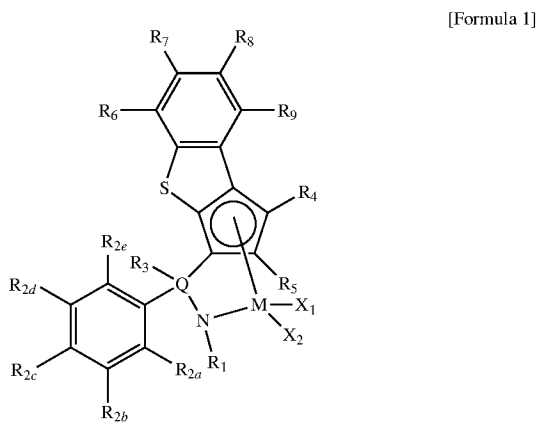

[Formula 1]

in Formula 1, $R_1$ is hydrogen; an alkyl having 1 to 20 carbon atoms; a cycloalkyl having 3 to 20 carbon atoms; an alkenyl having 2 to 20 carbon atoms; an alkoxy having 1 to 20 carbon atoms; an aryl having 6 to 20 carbon atoms; an arylalkoxy having 7 to 20 carbon atoms; an alkylaryl having 7 to 20 carbon atoms; or an arylalkyl having 7 to 20 carbon atoms, $R_{2a}$ to $R_{2e}$ each independently represent hydrogen; a halogen; an alkyl having 1 to 20 carbon atoms; a cycloalkyl having 3 to 20 carbon atoms; an alkenyl having 2 to 20 carbon atoms; an alkoxy having 1 to 20 carbon atoms; or an aryl having 6 to 20 carbon atoms, $R_3$ is hydrogen; a halogen; an alkyl having 1 to 20 carbon atoms; a cycloalkyl having 3 to 20 carbon atoms; an alkenyl having 2 to 20 carbon atoms; an aryl having 6 to 20 carbon atoms; an alkylaryl having 7 to 20 carbon atoms; an arylalkyl having 7 to 20 carbon atoms; an alkylamido having 1 to 20 carbon atoms; an arylamido having 6 to 20 carbon atoms; an alkylidene having 1 to 20 carbon atoms; or phenyl substituted with one or more selected from the group consisting of a halogen, an alkyl having 1 to 20 carbon atoms, a cycloalkyl having 3 to 20 carbon atoms, an alkenyl having 2 to 20 carbon atoms, an alkoxy having 1 to 20 carbon atoms, and an aryl having 6 to 20 carbon atoms, $R_4$ to $R_9$ each independently represent hydrogen; a silyl; an alkyl having 1 to 20 carbon atoms;

a cycloalkyl having 3 to 20 carbon atoms; an alkenyl having 2 to 20 carbon atoms; an aryl having 6 to 20 carbon atoms; an alkylaryl having 7 to 20 carbon atoms; an arylalkyl having 7 to 20 carbon atoms; or a metalloid radical of a Group 14 metal substituted with a hydrocarbyl having 1 to 20 carbon atoms; and two or more adjacent ones of $R_6$ to $R_9$ are optionally connected to each other to form an aliphatic ring having 5 to 20 carbon atoms or an aromatic ring having 6 to 20 carbon atoms, wherein the aliphatic ring or aromatic ring is optionally substituted with a halogen, an alkyl having 1 to 20 carbon atoms, an alkenyl having 2 to 12 carbon atoms, or an aryl having 6 to 12 carbon atoms Q is Si, or C, M is a Group 4 transition metal, $X_1$ and $X_2$ are each independently hydrogen; a halogen; an alkyl having 1 to 20 carbon atoms;

a cycloalkyl having 3 to 20 carbon atoms; an alkenyl having 2 to 20 carbon atoms; an aryl having 6 to 20 carbon atoms; an alkylaryl having 7 to 20 carbon atoms; an arylalkyl having 7 to 20 carbon atoms; an alkylamino having 1 to 20 carbon atoms; an arylamino having 6 to 20 carbon atoms; or an alkylidene having 1 to 20 carbon atoms.

10. The olefin-based polymer according to claim 9, wherein in Formula 1, $R_1$ is hydrogen or an alkyl having 1 to 12 carbon atoms, $R_{2a}$ to $R_{2e}$ each independently represent hydrogen; an alkyl having 1 to 12 carbon atoms; or an alkoxy having 1 to 12 carbon atoms, $R_3$ is hydrogen; an alkyl having 1 to 12 carbon atoms; or phenyl, $R_4$ and $R_5$ each independently represent hydrogen; or an alkyl having 1 to 12 carbon atoms, $R_6$ to $R_9$ each independently represent hydrogen or methyl, Q is Si, M is Ti, and $X_1$ and $X_2$ each independently represent hydrogen or an alkyl having 1 to 12 carbon atoms.

11. The olefin-based polymer according to claim 9, wherein the transition metal compound of Formula 1 comprises a compound represented by any one among the structures below:

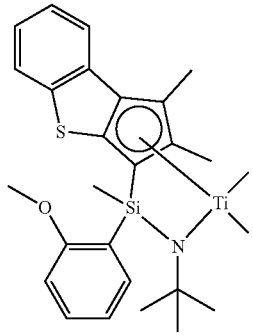

[Formula 1-1]

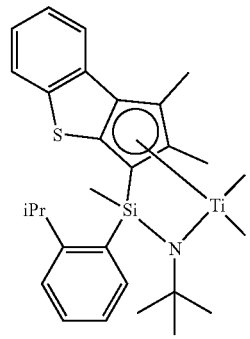

[Formula 1-2]

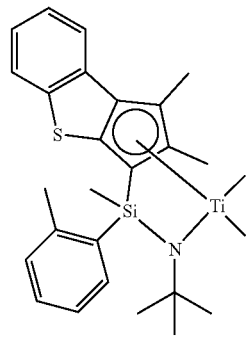

[Formula 1-3]

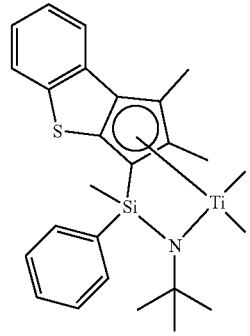

[Formula 1-4]

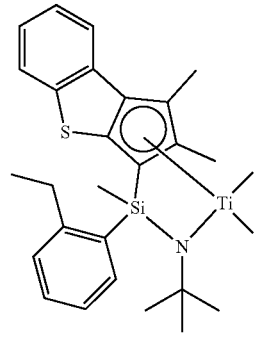

[Formula 1-5]

-continued

[Formula 1-6]

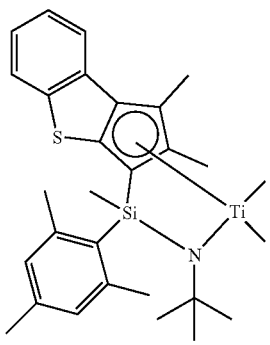

[Formula 1-7]

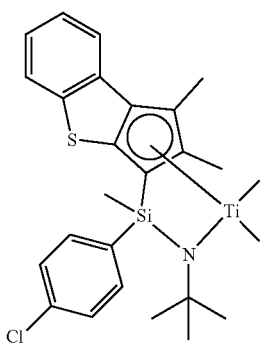

[Formula 1-8]

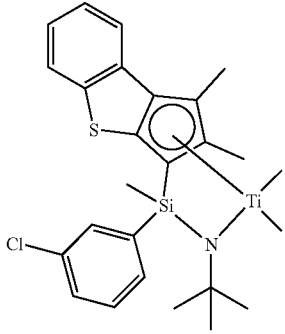

[Formula 1-9]

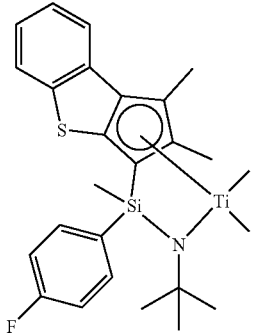

-continued

[Formula 1-10]

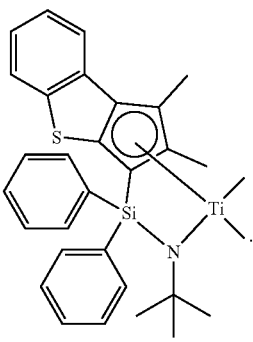

12. The olefin-based polymer according to claim 9, wherein the catalyst composition further includes one or more cocatalyst compounds represented by the following Formula 8, Formula 9 or Formula 10, $$-[Al(R_{11})-O]_a-, \quad \text{[Formula 8]}$$

$$A(R_{11})_3, \quad \text{[Formula 9]}$$

$$[L-H]^+[W(D)_4]^- \text{ or } [L]^+[W(D)_4]^-, \quad \text{[Formula 10]}$$

in Formulas 8 to 10, $R_{11}$ is the same or different, and each independently selected from the group consisting of a halogen, a hydrocarbyl having 1 to 20 carbon atoms, and a hydrocarbyl having 1 to 20 carbon atoms substituted with a halogen, A is aluminum or boron, D is independently an aryl having 6 to 20 carbon atoms or an alkyl having 1 to 20 carbon atoms in which at least one hydrogen atom is substituted with a substituent selected from the group consisting of a halogen, a hydrocarbyl having 1 to 20 carbon atoms, an alkoxy having 1 to 20 carbon atoms, and an aryloxy having 6 to 20 carbon atoms, H is a hydrogen atom, L is a neutral Lewis base and $[L-H]^+$ is a conjugated acid cation in $[L-H]^+[W(D)_4]^-$, and $[L]^+$ is a Lewis acid in $[L]^+[W(D)_4]^-$, W is a Group 13 element, and a is an integer of 2 or more.

13. The olefin-based polymer according to claim 9, wherein the polymerization of the olefin-based monomer is carried out at a temperature of about 25° C. to about 500° C., and a pressure of about 1 kgf/cm² to about 100 kgf/cm².

* * * * *